Dec. 31, 1968

W. B. WALTON 3,419,798

DISPLACEMENT SENSING TRANSDUCER USING HALL EFFECT DEVICES

Filed Dec. 17, 1965

INVENTOR.
WILLIAM B. WALTON
BY Schroeder, Siegfried
& Ryan ATTORNEYS

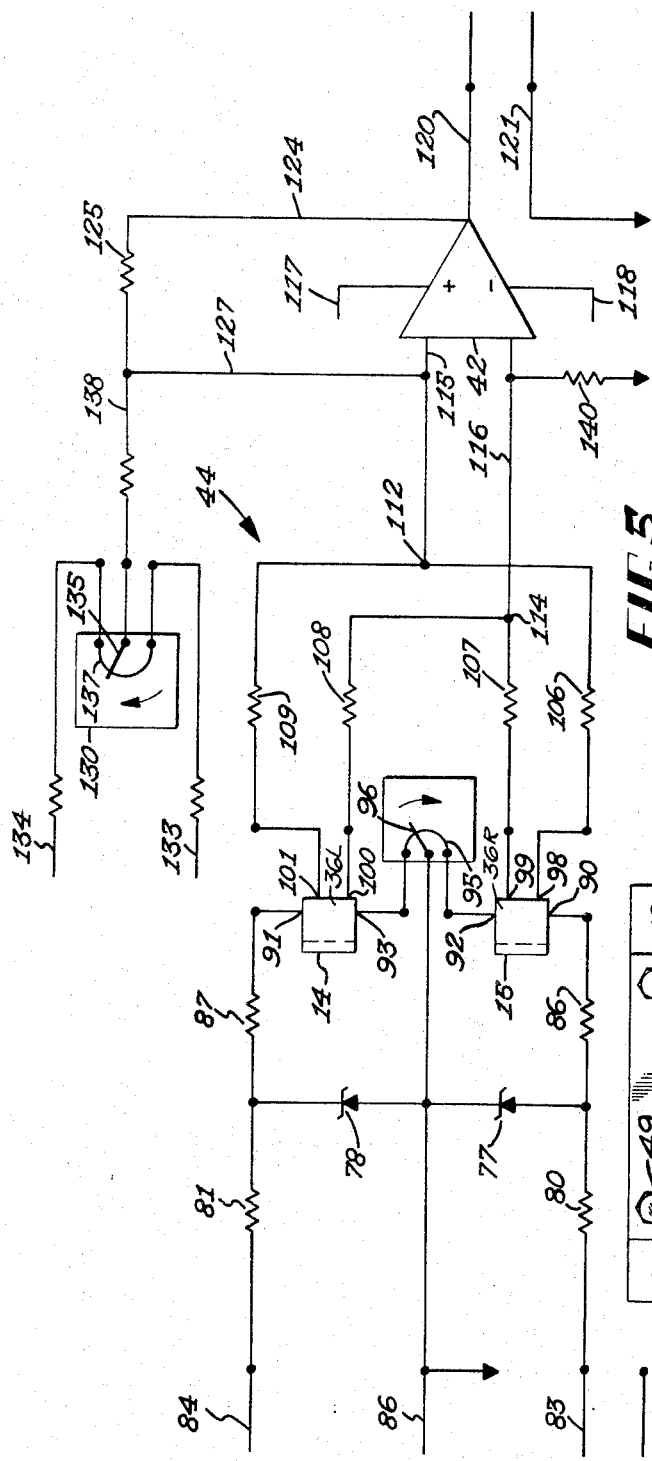

Dec. 31, 1968  W. B. WALTON  3,419,798

DISPLACEMENT SENSING TRANSDUCER USING HALL EFFECT DEVICES

Filed Dec. 17, 1965   Sheet 3 of 3

INVENTOR.
WILLIAM B. WALTON
BY Schroeder, Siegfried
 & Ryan
ATTORNEYS

United States Patent Office 3,419,798
Patented Dec. 31, 1968

3,419,798
DISPLACEMENT SENSING TRANSDUCER USING HALL EFFECT DEVICES
William B. Walton, St. Paul, Minn., assignor to Clark Equipment Company, a corporation of Michigan
Filed Dec. 17, 1965, Ser. No. 514,556
15 Claims. (Cl. 324—45)

ABSTRACT OF THE DISCLOSURE

A pair of Hall effect sensors are positioned side by side and spaced from a permanent magnet strip having such a curvature that upon movement of either the sensors or strip, along a given axis, the flux linking one Hall effect sensor is increased and the flux linking the other sensor is decreased. The outputs of the Hall sensors are algebraically summed to produce an output signal related to the relative positions of the sensors and magnet strip. The magnet strip is adjustably mounted whereby the curvature thereof may be shaped as desired. A magnetic shunt is mounted on the magnet strip to provide a reference point.

---

The present invention is directed to displacement sensing transducers and more particularly to an improved displacement sensing transducer utilizing a Hall generating device as a sensor.

The use of Hall effect generating devices in proximity and displacement transducers is well recognized and such apparatus has taken varying forms. Generally such devices utilize a variation in the magnetic field structure applied to the Hall generating device to provide various outputs and detect displacement or proximity of objects. This is normally accomplished by varying the flux gap in the core structure associated with a permanent magnet energizing the Hall generating device. The present invention is directed to an apparatus of this type which will detect displacement over wide ranges of distances and provide a signal output indicating to such displacement and changing in polarity to indicate relative positioning of the parts of the transducer. The prior devices utilize a compact or integral core structure associated with the Hall generating device which limits such range of measurement. The improved displacement sensing transducer of the present invention is therefore primarily accurate as a reference position locator and is useful in controlling servo mechanisms which effect displacement between objects where a reference position is required. The overall simplicity of this structure makes it readily applicable for wide ranges of applications with extreme accuracy in response.

It is therefore the principal object of this invention to provide an improved displacement sensing transducer.

Another object of this invention is to provide an improved displacement sensing transducer utilizing a Hall generating device and providing a linear output over wide ranges of displacement.

A still further object of this invention is to provide a transducer of this type incorporating an elongated permanent magnet with a characterized shape which cooperates with the sensing portion of the transducer to provide a signal output that senses in polarity and changes in magnitude over wide ranges of displacement.

Another object of this invention is to provide an improved displacement sensing transducer which is accurate in operation, is linear in output and is readily adaptable for proportional control in servo systems.

A further object of this invention is to provide an improved displacement sensing transducer in which a characterized elongated permanent magnet which cooperates with the sensing portion of the transducer has a magnetic shunt thereon to define a reference point for the transducer and alter the flux field emanating from the permanent magnet at a reference point.

It is also an object of this invention to provide a device of this type which is simple in design, low in cost and easy to maintain.

These and other objects of this invention will become apparent from a reading of the attached description together with the drawings wherein:

FIG. 3 is a sectional view of the improved displacement sensing transducer of FIG. 1 taken along the lines 3—3 therein to show the pole faces of the core structure;

FIG. 5 is a circuit diagram of the improved displacement sensing transducer;

FIG. 6 is a graph of the operation of the improved displacement sensing transducer;

Figure 1:
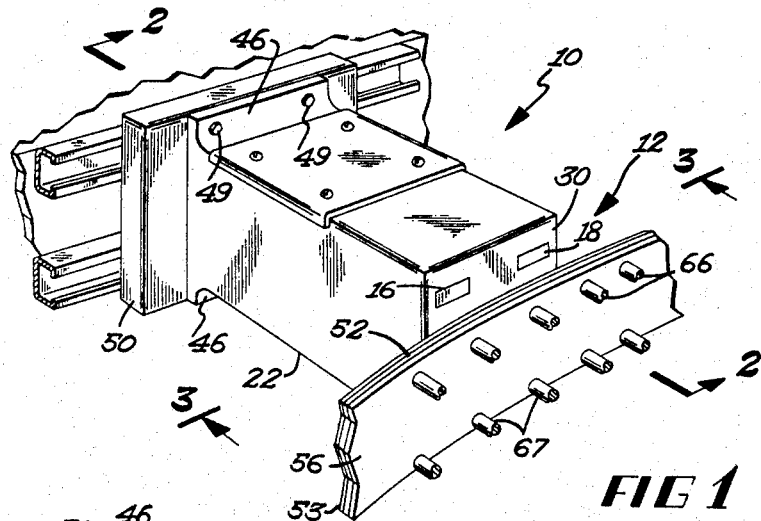
FIG. 1 is a perspective view of the improved displacement sensing transducer.
Figure 2:
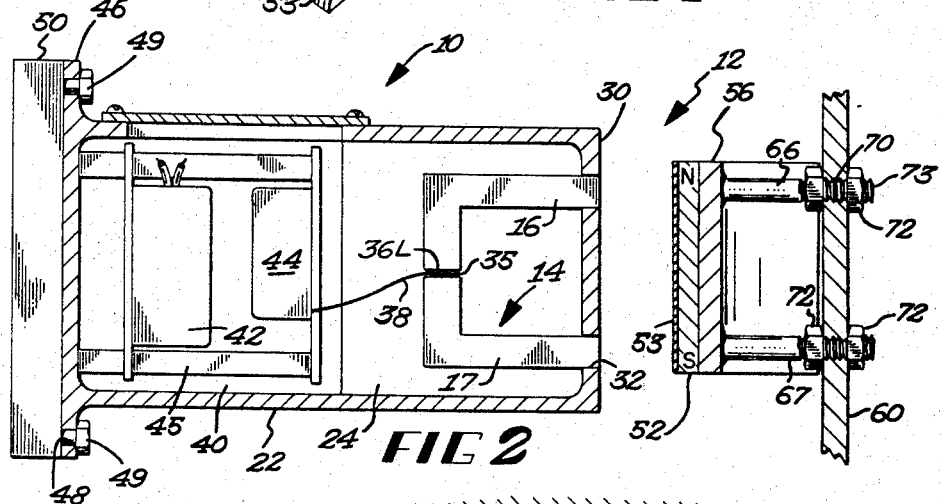
FIG. 2 is a sectional view of the improved displacement sensing transducer taken through a reference position as indicated by the lines 2—2 in FIG. 1.

The improved displacement sensing transducer is shown herein as a unit readily adaptable to measure and sense relative displacement between two objects over a relative free wide range of displacement. As will be seen in FIG. 1, the transducer is comprised basically of a sensor mounting assembly, indicated generally at 10, and a permanent magnet assembly, indicated generally at 12. Such units are adapted to be mounted on relatively movable objects or structures, respectively, such that they may sense the relative position along the relative line of movement and produce an output signal in response thereto. As will be hereinafter identified, the sensor mounting assembly includes a pair of spaced sensors each incorporating a Hall effect device. This unit is a well known semi-conductor type unit which has characteristics to produce an electric potential along one axis of the unit in response to an electric current and a magnetic field along axes normal to the semi-conducting material. The output of such a device depends on the characteristics of the semi-conductor material and the dimensions of the unit, and the potential output will vary substantially linearly with variations in magnetic fields and in the electric current. In the improved displacement sensing transducer, the magnetic field source in the form of a permanent magnet is physically separated from the remaining portion of the transducer by an air gap and a core structure directs the flux lines emanating from the permanent magnet through the Hall effect device. Thus as will be seen in the drawings, two such sensors 14, 15 with associated core structures formed of core members 16, 17 and 18, 20 respectively are positioned in the sensor mounting structure 10. As will be best seen in the sectional view of FIG. 2, the sensor mounting structure includes a housing 22 having an opening or recess 24 therein in which is positioned the core members 16, 17 and 18, 20 respectively. Each of the core members is identical in construction and dimension, being L-shaped in form and adapted to concentrate flux lines at predetermined portions of the sensors. They are mounted in the end wall or face 30 of the housing 22 to project through apertures 32 therein and provide end or pole faces exposed on the active surface of the sensor or the side 30. Thus each sensor is formed of two core members which define a generally C-shaped structure with the extremities of the core members mounted in the end wall of the mounting casing and defining an air gap, such as is indicated at 35, in the middle of the C-shaped structure in which a respective semi-conductor type Hall effect device 36L is positioned. The core members 16, 17 and 18, 20, respectively, are aligned individually in the same plane and each pair of the core members are spaced from one another along the width of the casing or housing 22 for purposes to be later noted. The end face of the respective core members for each of the sensors are disposed in a common plane, this being the end face 30 of the housing 22. The respective Hall effect devices 36L and 36R (left and right) have input conductors and output conductors connected thereto which, as indicated in FIGURE 2, are combined in a cable 38 leading to a second recessed portion 40 of the housing. The latter recess mounts or encloses the amplifying device, indicated in block at 42 the excitation circuit indicated at block 44 and the electric circuitry (not shown in FIGURE 2) in a suitable supporting structure 45. Housing 22 is made of a non-magnetic material, such as aluminum, and includes flange sections 46 with apertures 48 therein through which suitable mounting bolts 49 connect the sensor assembly to an object, such as indicated at 50.

The magnetic assembly 12 includes an elongated permanent magnet strip 52 which is magnetized along its extent such that the edges or each half of the width define opposite polarity poles with the same polarity sections along the edges extending throughout the entire length of the strip. Any magnetic material that is flexible such that it may be bent or shaped into a curved structure is suitable. Further, it may be covered with a suitable rubberized coating, such as is indicated at 53, to further protect the magnet from mechanical shock, if desired. The magnetic strip is in effect an elongated permanent magnet, which is magnetized along its width such that the upper and lower edges of the same will define opposite polarity magnetic poles which will generate a flux field to be directed through the core members for each of the sensors. I have found that a suitable backing strip 56 of ferromagnetic material suitably attached to the permanent magnet will enchance the magnetic properties of the same and may be used as a suitable support and backing. Such a ferromagnetic material will adhere to the permanent magnet for mounting the same. The width of the permanent magnet and its ferromagnetic backing is slightly greater than the vertical spacing between the pole faces or ends of the core members 16, 17 and 18, 20 exposed on the surface 30 of the housing 22 such that these pole faces or ends of the core structure will be disposed adjacent and aligned with the maximum polarity extremities or edges or the magnet to receive flux lines therefrom and direct the same across the Hall effect device to magnetically excite or energize the same.

Figure 4A:
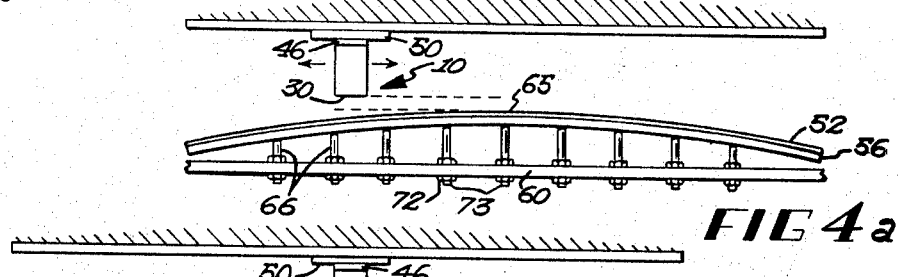
FIG. 4a is a top schematic view of one embodiment of the improved displacement sensing transducer.
Figure 4B:
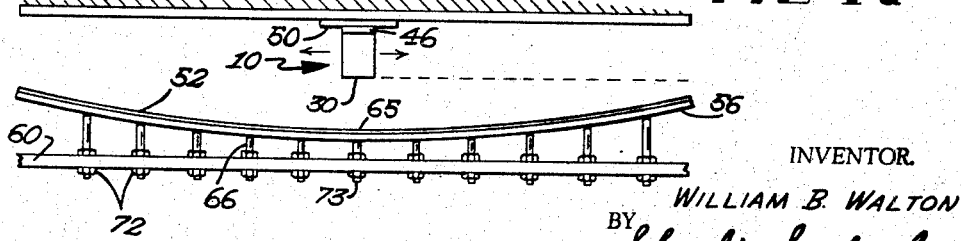
FIG. 4b is a top schematic view of another embodiment of the improved displacement sensing transducer.

The magnetic strip 52 of the permanent magnet is flexible and is adapted to be mounted on a second object 60. Relative movement between the objects 50 and 60 or the sensing structure 10 and magnet structure 12 mounted thereon will be sensed and measured by the improved transducer. The elongated permanent magnet or magnet strip is bent along its extent to define either a parabolic or hyperbolic curve with a reference or single line surface which is either closest to or furthest away from the sensor depending upon the curved configuration. Thus as will be seen in the schematic view of FIG. 4a, the curved surface of the magnetic strip is generally parabolic with respect to the sensing structure 10 and defines a reference point 65 along its extent which is closest to the sensor. Movement to either side of this reference point will produce varying spacings or air gaps between the permanent magnet strip and the respective sensors to provide different magnetic intensities or magnetic fields being directed to their respective Hall effect devices to magnetically vary the energization or flux density applied to the same. In the reference position, the sensing structure is located with its pair of sensors spaced respectively and equidistantly to either side of the reference point 65 such that the same air gap appears between the permanent magnet surface and the pole faces or core members of the respective sensors to provide the same magnetic energization or flux density to each of the respective Hall effect devices and to thereby provide the same voltage output with a constant and same electrical energization applied to the Hall effect devices. The curved characterization or contour of the magnetic strip of the permanent magnet assembly 12 is effected through its mounting on the member 60 by a plurality of supporting pins 66, 67 which are connected at one extremity to the ferromagnetic backing material 56 of the permanent magnet and extends through spaced apertures 70 in the object or frame 60 with adjusting nuts 72 on either side of the aperture and threaded on the threaded extremity 73 of the pins to adjustably position the same on the member 60 and hence position the magnetic strip relative thereto. Such structure is shown schematically in FIGURE 4 with the bearing pins being adjustably positioned to varying lengths through the object or frame 60 to define the parabolic contour extremity with the high or reference point 65 at the midpoint thereon. It will be recognized, that the curve may be inverted to be hyperbolic in shape, if desired, as shown in FIG. 4b. The relationship between the permanent magnet and the sensing structure with the core members of the sensors therein is such that they will normally be spaced apart a minimum distance necessary for mechanical clearance at the reference point. The plane of relative movement of the sensing mounting structure and the permanent magnet assembly is parallel to a plane passing through the reference point or surface on the curved periphery of the permanent magnet and tangent at this point. This plane of movement is also parallel to the surface 30 of the mounting structure in which the end surfaces or pole faces of the core members lie and are exposed. We have found that a minimum distance of one-sixteenth of an inch and a maximum distance of three-quarters of an inch provide a satisfactory range of displacement or positioning of these parts. Further, the elongated permanent magnetic strip will be so aligned with the mounting structure in this plane of relative movement such that the pole extremities will be disposed relative to or adjacent the edges of the permanent magnet near the pole edges of the same at all times. As relative movement takes place between the sensor mounting structure 10 and the permanent magnet assembly 12, a variable air gap is introduced between the ends of the core members of each of the sensors and the permanent magnet strip disposed adjacent thereto to provide a differential output from the transducer as will be hereinafter defined. Such output will be reversible in polarity on either side of the reference point and variable in magnitude as a function of the displacement from the reference point or line. The respective core members for each sensor direct the flux lines from opposite extremities of the permanent magnet to opposed surfaces of the Hall effect devices 36L and 36R to bias the surfaces with magnetic flux lines and hence direct flux lines therethrough normal to the flow of exciting current therein. This will produce the output current in the Hall effect device in a well known manner. By varying the air gap with relative movement of the parts of the transducer, a variable output is obtained from each of the sensors of the transducer. The outputs are summed together to produce an output signal varying as a function of such displacement. This will provide a wide range of movement for the transducer to permit it to be used as a controlling device in the positioning of the objects relative thereto. Normally the sensor mounting structure is attached to the movable element while the permanent magnet structure is attached to the stationary part or object between which relative movement takes place. It will be recognized, however, that within the scope of the present invention either may be made movable while the other is held stationary.

The improved transducer incorporates the amplifying device, indicated at 42, together with the excitation circuit, indicated generally at 44, which connects respectively to the inputs and outputs of the Hall effect devices 36L and 36R in the manner shown in the circuit diagram of FIG. 5. This circuit diagram shows the signal amplifier assembly which contains all of the transducer electronics and provides the basic function of supplying current to the converters or Hall effect devices, algebraically sums the outputs of the Hall effect devices, and amplifies the resulting control output. Thus as will be seen in FIG. 5, a regulated power source in the form of a pair of Zener diodes 77, 78 and resistors 80, 81 are connected across a DC power source, indicated by conductors 83, 84, to provide a constant voltage source to the excitation circuits of the Hall effect devices 36L and 36R. The conductors 83, 84 represent positive and negative DC supplies, such as a +15 and a −15 volt supply with a common grounded conductor or reference conductor 86. The resistors 80, 81 are connected in the supply conductors 83, 84 with the Zener diodes being connected between the common conductor 86 and the supply conductors 83, 84. Temperature compensating resistors 86, 87 are connected respectively to the common points between the regulating resistors 80, 81 and the associated diodes 77, 78 and to input terminals 90, 91 respectively of the Hall effect devices. The opposite input terminals 92, 93 on each device respectively are connected through a gain balancing potentiometer 95 with the wiper 96 being connected to the common or grounded conductor 86 to complete the energizing circuit.

In the Hall effect devices 36L and 36R, the input terminals 91, 93 and 90, 92 respectively provide an energization circuit across one axis of the semi-conductor material. Output terminals 98, 99 and 100, 101 of devices 36R and 36L respectively are aligned with the opposite axes of the material. These output terminals 98, 99 and 100, 101 for the Hall effect devices 36R and 36L of the pair of sensors are connected respectively in a bridge type network formed of resistors 106, 107, 108 and 109 respectively. The output of this network is taken between the resistors 106 and 109, as at 112, and between resistors 107, 108, as at 114, through conductors 115, 116 leading to the input terminals of the amplifier 42. The amplifier includes supply input terminals 117, 118 which are connected respectively to the positive and negative polarity sources with an output terminal 120 and a ground terminal 121 across which the output appears. In this circuit, a feedback loop in the form of a conductor 124 connected to the output terminal 120 through a resistor 125 is connected back through a conductor 127 to the input of the amplifier. Further, the amplifier has connected thereto an offset adjusting network in the form of a potentiometer 130 whose windings 137 is connected at its extremities to the opposite polarity supply conductors 133, 134 with a wiper 135 of the adjusting potentiometer being connected through the conductor 138 leading to the feedback circuit conductor 127 and the input of the amplifier 42. Also connected between conductor 116 and ground is a differential gain matching resistor 140. The amplifier 42 is differentially connected and the generating devices 36L and 36R are oppositely energized electrically so that the output of the same are of opposite polarity. Thus only the algebraically summed output appears across the input terminals through the amplifier which amplifies the same to produce the signal output. In the reference position, this output is at null to provide the controlling effect desired. In this improved displacement sensing transducer, any type of amplifying device 42 and generating Hall unit 36 may be utilized as long as they are compatible.

In my improved displacement sensing transducer, the pair of sensors positioned in side by side and spaced parallel relationship in a mounting structure cooperates with a permanent magnet which energizes the Hall effect devices included in each sensor. Similarly the electronic circuit provides a regulated voltage and current to the devices to electrically excite the same across one axis of the unit. The magnetic field applied to the Hall effect devariable air gap or reluctance introduced into the magnet with respect to the core structure which collects and directs the flux lines to the semi-conductor type material of the Hall effect units. Since the magnetic circuit, that is the core members, are identical in construction and the air gaps at the Hall effect units are constant, the outputs of the Hall effect units in the air gaps are controlled by the variable air gaps or reluctance introduced into the magnetic circuit between the permanent magnet and the core members. This air gap is made up of a fixed spacing between the relatively movable elements of the transducer and the variable spacing which is brought about by curving the permanent magnet along its extent or characterizing the same. This arrangement of parts provides a wide angle displacement transducer which produces a null output signal at the reference point and a reversible polarity and variable magnitude signal at any other position. Thus the contour of the permanent magnet or magnetic strip may be parabolic or hyperbolic and will still produce a null output at the reference position in which the core structures are positioned to have the same air gap between themselves and the permanent magnet. I have found in practice that a permanent magnet strip 1½ inches wide, ⅛-inch thick and 48 inches long with a minimum spacing of ¹⁄₁₆ to a maximum of ¾ of an inch between the permanent magnet and the core members in the reference position will produce a desired output. Further the spacing between the core members for the respective sensors in the mounting structure under these conditions is approximately 2¾ inches.

The improved displacement sensing transducer permits sensing of longitudinal movement between parts of the transducer and permits mounting of the same on relatively movable supporting structures to accurately and simply sense displacement therebetween. The output may be utilized for control of servo mechanisms effecting such relative displacement between objects. In FIG. 6, a graph is shown of the transducer output in terms of volts verses displacement of the parts from the reference position. Thus it will be seen that the output signal will vary from a +3 to a −3 volts approximately over the entire range of displacement of the sensor core members or mounting structure relative to the permanent magnet from one extent to the other with a null output at the reference position.

Figure 7:
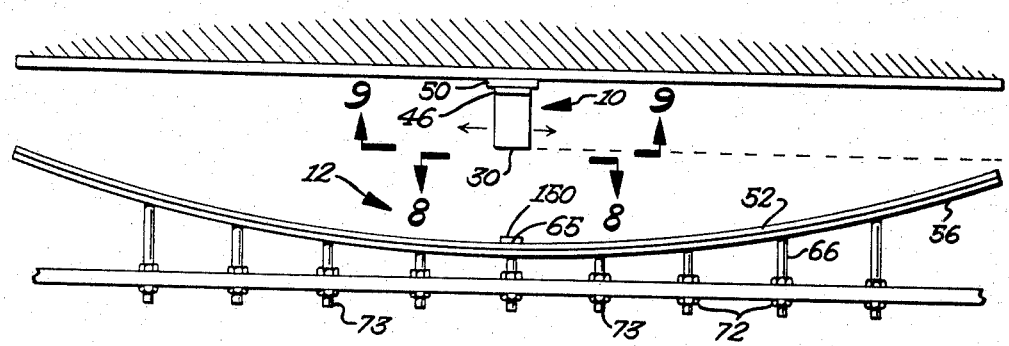
FIG. 7 is a top schematic view of still another embodiment of the improved displacement sensing transducer.
Figure 8:
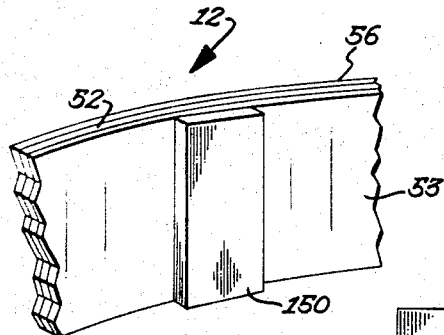
FIG. 8 is a sectional view of the improved displacement sensing transducer of FIG. 7 taken along the lines 8—8 therein to show a magnetic shunt on the elongated permanent magnet of the transducer.
Figure 9:
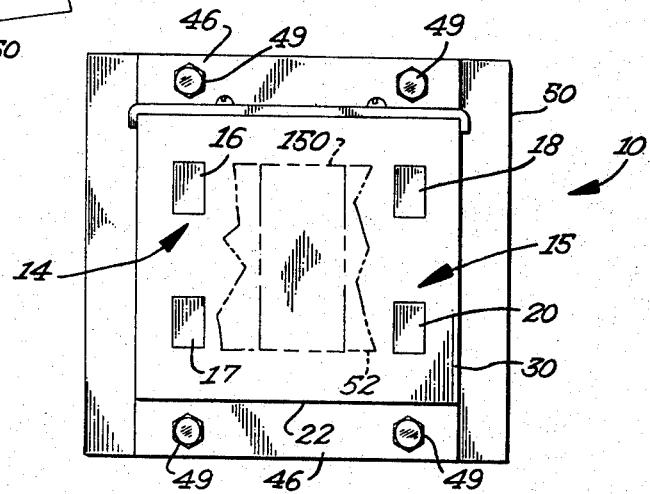
FIG. 9 is a sectional view of the improved displacement sensing transducer of FIG. 7 taken along the lines 9—9 therein with parts of the elongated magnet shown in phantom to show relationship of parts.

FIGS. 7, 8 and 9 show another embodiment of the improved displacement sensing transducer particularly adapted for use with wide ranges of displacement of the elements of the transducer. In the alternate embodiment, the sensor mounting assembly together with its associated parts and output circuit remain unchanged from that of the before mentioned embodiments and hence their specific description will be omitted herein for simplicity. Further, the mounting of the elongated magnet or permanent magnet strip and its characterized shape, whether parabolic or hyperbolic, together with the associated backing and a protective covering, if desired, are also unchanged and will not be specifically described. Where the parts between the embodiments are similar, similar numbering will be utilized for simplicity.

Figure 10:
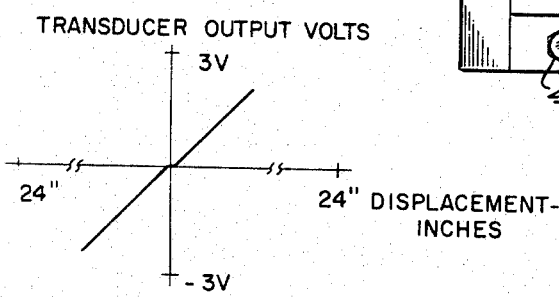
FIG. 10 is a graph of the operation of the alternate embodiment of the improved displacement sensing transducer of FIGS. 7, 8, and 9.

Thus as will be seen in FIGS. 7, 8 and 9, the improved sensing mounting structure mounting the pair of sensors together with the associated summing network and amplifier assembly (not shown) are adapted to cooperate with the magnet structure 12 which is shown in FIGS. 7 and 8 as curved in a hyperbolic manner relative to the sensing mounting structure 10. The curvature is defined by the plurality of pins 66 attached to the backing 56 mounting the elongated permanent magnet or permanently magnetized strip 52. Where the elongated magnet is such in length that the change in air gap between the face of the permanent magnet 52 and the pole structures or faces 16, 17 and 18, 20 of the sensors is relatively small, the null point or zero output reference will sometimes not be accurately defined and will be subject to shifting with magnetic and electrical unbalance in the respective sensor components. Since the null output is obtained by balancing the output of two sensors which are respectively energized by the magnetic flux flowing from the polar edges of the permanent magnet, the electrical network which sums the opposite polarity output signals of the respective sensors may become critical in operation when the air gap between the permanent magnet and the sensor structure 10 is large. Under such conditions, the null reference point shown at 65 in the before mentioned embodiment may be more accurately defined to improve the operation of the displacement sensing transducer by use of a shunt strip 150 positioned on the face of the permanent magnet strip at the reference point. As will be seen in FIG. 8, the strip or block is positioned on the face of the permanent magnet strip between it and the sensor structure 10 with a strip extending between the edges of the width of the elongated strip to effect a shunt at the reference point between the polar edges of the same. The width of shunt strip 150 is shown in phantom in FIG. 9 along with a portion of the permanent magnet 52 to give the appropriate relative physical size with respect to the spacing between the core members 16, 17, 18, and 20 respectively. From a practical standpoint, I found that the width of the shunt should be no greater than the width of the spacing between the core members forming the respective sensors and preferably less than the same to effect a shunt of the permanent magnet at the reference point. This will substantially diminish the flux emanating from the permanent magnet at the polar surfaces of the permanent magnet into the core members and onto the respective Hall effect devices 36 of the sensors 14, 15 to alter the output of the amplifier and positively define a null reference point. This will eliminate problems and instability through temperature variation, magnetic unbalance, and the like. It will also more positively define the output with respect to the reference point when the radius of curvature of the permanent magnet is slight. Thus, as will be seen in FIG. 10, a generalized graph representing the voltage output of the amplifier plotted against the displacement of the parts from the reference position indicates that at or approaching the null position the output of the sensors theoretically becomes zero because of the presence of the shunt to reduce the output of the respective sensors 14, 15. Actually, there is a momentary peaking of the transducer output near the null position when the shunt covers one sensor and not the other. This peaked output, however, will be masked by the associated equipment normally included with a servo control which employs suitable electrical damping. The increase in null area will positively define the reference point so that the transducer may be utilized without instability in high speed servo mechanisms. The disadvantage in increasing the width of the null point is offset by the positive positioning of the same. It will be understood that the improvement in this embodiment is applicable under certain conditions and that the improved displacement sensing transducer in the original form of FIGS. 1–7 will provide an accurate output under all of the conditions.

The output of the amplifying apparatus and the sensors 14, 15 remains unchanged from the previous embodiment and displacement of the sensor to either side of the reference position will provide the same output and operation as that previously described.

In considering this invention it should be remembered that the present disclosure is intended to be illustrative only and the scope of the invention should be determined by the appended claims.

What is claimed is:

1. A displacement sensing transducer for sensing the relative position of two objects movable relative to each other along a line of movement comprising:
   a magnetic strip having a surface curved relative to the line of movement and mounted on one object,
   two Hall effect sensors mounted on the other object at a position to pass adjacent the magnetic strip upon movement of the objects along said line of movement and spaced apart from each other in a direction substantially parallel to the line of movement with each sensor adapted to produce an output signal varying as a function of the magnetic field respectively applied to each sensor by the magnetic strip, and
   means responsive to the output signals for producing a control output having a magnitude varying as a function of said output signals.

2. A displacement sensing transducer according to claim 1 wherein said line of movement is parallel to a plane tangent to the curved magnetic strip at a selected reference point.

3. The displacement sensing transducer of claim 2 in which each of the sensors includes a pair of L-shaped core members of magnetizable material whose extremities are positioned in the plane of the surface of the mounting means and in contact with opposite surfaces of the Hall generator device respectively.

4. A displacement sensing transducer according to claim 2 also including means for shunting the magnetic strip between its polar extremities to reduce the magnetic field at the selected reference point.

5. A displacement sensing transducer according to claim 1 wherein the curvature of the magnetic strip relative to the line of movement is parabolic.

6. A displacement sensing transducer according to claim 1 wherein the curvature of the magnetic strip relative to the line of movement is hyperbolic.

7. A displacement sensing transducer according to claim 1 wherein the strip of magnetic material is a permanent magnet strip having a backing strip of highly permeable magnetic material and a shock absorbing covering.

8. A displacement sensing transducer according to claim 7 wherein the permanent magnet strip and the backing strip are made of a flexible material and are mounted on a frame with a plurality of adjusting pins positioned behind the backing strip to adjust the curvature of the strips.

9. A displacement sensing transducer according to claim 1 also including means for reducing the magnetic field from the magnetic strip applied to the sensors at a selected portion of the magnetic strip.

10. A displacement sensing transducer according to claim 9 wherein said means for reducing the magnetic field comprises a shunt of highly permeable magnetic material positioned between the edges of the magnetic strip to reduced the magnetic field emanating from the selected portion of said magnetic strip.

11. A displacement sensing transducer according to claim 10 wherein the permeable magnetic material extends between the edges of the magnetic strip and has a width no greater than the spacing between the sensors.

12. A displacement sensing transducer according to claim 1 wherein said means comprises an amplifier connected to receive the output signals of the Hall effect sensors as an input to provide a reversible polarity and variable magnitude control output proportional to the difference between said output signals.

13. A displacement sensing transducer according to claim 1 wherein the magnetic strip is an elongated permanent magnet having opposite polarity pole surfaces along the edge extents of the same throughout the entire extent of the magnet.

14. A transducer according to claim 1 wherein said control output has a magnitude varying as a function of the difference between the output signals and a polarity determined by the relative magnitude of said two output signals.

15. A transducer according to claim 14 wherein said magnitude is proportional to the difference between the output signals.

References Cited

UNITED STATES PATENTS

| | | | |
|---|---|---|---|
| 3,359,522 | 12/1967 | Albrecht et al. | 324—45 X |
| 2,602,660 | 7/1952 | Shannon | 324—34 |
| 3,124,725 | 3/1964 | Leguillon | 335—303 |
| 3,185,866 | 5/1965 | Harpell | 336—133 X |
| 3,243,692 | 3/1966 | Heissmeier et al. | 336—134 X |

FOREIGN PATENTS 938,705 10/1963 Great Britain.

RUDOLPH V. ROLINEC, *Primary Examiner.*

A. E. SMITH, *Assistant Examiner.*

U.S. Cl. X.R.

340—282

UNITED STATES PATENT OFFICE
CERTIFICATE OF CORRECTION

Patent No. 3,419,798                          December 31, 1968

William B. Walton

It is certified that error appears in the above identified patent and that said Letters Patent are hereby corrected as shown below:

Column 1, line 39, after "indicating" cancel "to". Column 3, line 64, "or" should read -- of --. Column 6, line 10, "cooperates" should read -- cooperate --; lines 15 to 17, "devariable air gap or reluctance introduced into the magnet" should read -- devices is varied by variably positioning the permanent magnet --. Column 8, line 65, "reduced" should read -- reduce --.

Signed and sealed this 17th day of March 1970.

(SEAL)
Attest:

Edward M. Fletcher, Jr.                            WILLIAM E. SCHUYLER, JR.
Attesting Officer                                          Commissioner of Patents